(12) United States Patent
Cross

(10) Patent No.: US 12,004,691 B1
(45) Date of Patent: Jun. 11, 2024

(54) TOOL FOR ROASTING OVER OPEN FLAME OR HEAT SOURCE

(71) Applicant: Robert Cross, Putnam Valley, NY (US)

(72) Inventor: Robert Cross, Putnam Valley, NY (US)

( * ) Notice: Subject to any disclaimer, the term of this patent is extended or adjusted under 35 U.S.C. 154(b) by 713 days.

(21) Appl. No.: 17/169,498

(22) Filed: Feb. 7, 2021

Related U.S. Application Data

(60) Provisional application No. 62/971,397, filed on Feb. 7, 2020.

(51) Int. Cl.
*A47J 43/28* (2006.01)
*A47J 37/07* (2006.01)

(52) U.S. Cl.
CPC ......... *A47J 43/283* (2013.01); *A47J 37/0786* (2013.01)

(58) Field of Classification Search
CPC ......... A47J 43/18; A47J 43/283; A47J 37/07; A47J 37/0786; A47G 21/10
USPC ...................................... 294/9, 11, 99.2, 118
See application file for complete search history.

(56) References Cited

U.S. PATENT DOCUMENTS

| | | | | |
|---|---|---|---|---|
| 1,945,165 A | * | 1/1934 | Smith | A47J 37/0694 |
| | | | | D7/669 |
| 2,642,796 A | * | 6/1953 | La Bore | A47J 37/0694 |
| | | | | 99/441 |
| 2,689,518 A | * | 9/1954 | Beach | A47J 37/0694 |
| | | | | 99/402 |
| 3,361,468 A | * | 1/1968 | Case | A47J 43/283 |
| | | | | 294/8 |
| 4,002,365 A | * | 1/1977 | Rader | A47J 43/283 |
| | | | | 294/8 |
| 4,005,893 A | * | 2/1977 | Tash | A47J 43/283 |
| | | | | 294/16 |
| 4,606,569 A | * | 8/1986 | Dunn | A47G 21/10 |
| | | | | 294/16 |
| 5,601,323 A | * | 2/1997 | Kaiser | A47J 37/0786 |
| | | | | 294/7 |
| 5,887,492 A | | 3/1999 | De Laney | |

(Continued)

FOREIGN PATENT DOCUMENTS

| CN | 101726013 A | 6/2010 |
|---|---|---|
| CN | 203371406 U | 1/2014 |

(Continued)

OTHER PUBLICATIONS

Farberware BBQ Scissor Tongs, 17-Inch, Amazon Product page printed Feb. 7, 2021.

*Primary Examiner* — Dean J Kramer
(74) *Attorney, Agent, or Firm* — Leason Ellis LLP

(57) ABSTRACT

A tool generally includes a food holding region and a handle region. The food holding section generally includes two opposing and pivotally engaged pairs of holding arms. Each pair of holding arms forms a side of the food cage, so that when the tool is in the closed position and food of appropriate dimension is inserted therein, the cage holds the food about its outer surfaces. The holding section includes a center-facing end toward the pivot structure and/or portion, and a distal end that is blunted or rounded, formed by the bent shape of the holding arms. The handle section includes handle section legs extending from the pivot structure and/or portion each to a distal end configured and dimensioned for holding and manipulating the tool.

10 Claims, 4 Drawing Sheets

(56) References Cited

U.S. PATENT DOCUMENTS

| | | | | |
|---|---|---|---|---|
| 7,011,015 B1* | 3/2006 | Marghella | ............... | A21D 13/44 |
| | | | | 294/7 |
| 7,090,269 B2* | 8/2006 | Kelsey | ................. | A47J 43/283 |
| | | | | 294/16 |
| 7,644,532 B2* | 1/2010 | Capio | ................... | A01K 77/00 |
| | | | | 43/7 |
| 8,348,317 B1* | 1/2013 | Bird | ......................... | A45F 3/14 |
| | | | | 294/902 |
| 2018/0078271 A1 | 3/2018 | Thrasher, III | | |

FOREIGN PATENT DOCUMENTS

| | | |
|---|---|---|
| JP | 03133545 U | 7/2007 |
| JP | 03186691 U | 10/2013 |
| JP | D1546283 | 3/2016 |
| KR | 2013088217 A | 8/2013 |

\* cited by examiner

TOOL FOR ROASTING OVER OPEN FLAME OR HEAT SOURCE

RELATED APPLICATIONS

This application claims the benefit of priority of provisional application 62/971,397 filed on Feb. 7, 2020, which is incorporated by reference herein.

BACKGROUND

Field of the Invention

The present invention relates to a tool for roasting a foodstuff over an open heat source without piercing or crushing the foodstuff.

Description of Related Art

Known apparatuses or "tools" for holding foodstuff over an open flame are those that skewer the foodstuff. These exist be with a single skewer (in a most common form, a pointed stick holding a marshmallow or frankfurter), or an elongated fork with two or more prongs. While useful and ubiquitous, these simple tools have drawbacks. For instance, food may slip on the skewer along its length if not held at the proper angle. In addition, if the skewer is not properly centered, the food can break apart and fall off. In addition, pointed ends of the skewers are inherently dangerous and precaution must be taken to prevent injuries from accidental poking or due to horseplay amongst users. Therefore, a need exists for an improved tool for roasting food over an open flame.

The tool herein overcomes the problems of food falling from the skewer by holding the food rather than skewering it. The foodstuff is held around the outside surfaces thereof, rather than skewering partially or completely through the foodstuff.

In addition, tool herein overcomes the problems associated with pointed ends with a blunt or rounded tip with no exposed prongs or points.

SUMMARY

In general, two opposing and pivotally engaged pairs of holding arms form one or more cages for holding food around its outer surfaces (rather than by skewering) so that the food can be held over an open flame for cooking.

In certain embodiments, the tool generally includes a food holding region and a handle region. The food holding section generally includes two opposing and pivotally engaged pairs of holding arms. Each pair of holding arms forms a side of the food cage, so that when the tool is in the closed position and food of appropriate dimension is inserted therein, the cage holds the food about its outer surfaces. The holding section includes a center-facing end toward the pivot structure and/or portion, and a distal end that is blunted or rounded, formed by the bent shape of the holding arms. The handle section includes handle section legs extending from the pivot structure and/or portion each to a distal end configured and dimensioned for holding and manipulating the tool.

BRIEF DESCRIPTION OF THE DRAWINGS

The invention will be described in further detail below and with reference to the attached drawings in which the same or similar elements are referred to by the same number, and where.

DESCRIPTION

In one embodiment, shown with respect to FIGS. 1-4, an apparatus is provided for holding foodstuffs between two tong members, shown as opposing sides S1 and S2 of a holding device. In particular, as shown in the figures, each side has a pair of arms A. In addition, one or more cavities C are provided between concave portions I in each arm A1, A2 of the sides S1, S2. The arms can be parallel along the length of the tool as shown, or alternatively can be non-parallel for all or a portion of the length except for the area forming the cavity.

At the distal end of the tool where the cavities are situated, the tip is rounded, as shown by a bend in the structure forming the arms, for instance, A1a and A1b on side S1 to form tip T1. In other embodiments, a connector can be provided between the arms, for instance, secured with a double-ended threaded fastener. In preferred embodiments the tips are all rounded so as to prevent injury by poking or scratching.

The cavities can be formed by concave portions that are identical on each side S1/S2, as shown, or in certain embodiments the opposing sides can have different shapes. For instance, one side can be straight so that the cavity is formed by concave portions on one side only. In other embodiments, the concave portions on one side are deeper than the other. The shapes of the concave portions are shown as semi-circles, but other shapes are possible, including shallower arcs, rectangular, square, U, V, sideways-C or sideways-D shaped, or even having multiple contact points when holding, such as a meandering or zig-zag shape.

The handle section can be of any suitable shape or configuration, and can include heat insulating material and any other features to enhance user comfort. In certain embodiments heat resistant material at the handle is optional, and the user can wear a glove or use a pot-holder to counter the heat of the structure.

Further, optionally, an elastic member such as a spring can be positioned between the tong members so that the user can manipulate the handles in resistance to the elastic member, so that the cavity may be biased, between uses, by the elastic members to maintain its closed or open position.

At the connection point serving as a fulcrum for a pivotable or rotatable motion, a bar-shaped pivot stud, such as a pin or bolt, can be used to facilitate rotation about the pivot axis.

While a single pivot towards the middle of the tool is shown, as a first-class double-lever with the central pivot acting as the fulcrum, other tong-like or scissor-like structures are possible. In other configurations, a third-class lever with the pivot at the end opposite the food holding section can be used (which can in certain embodiments be a simple V or U bend at the end of the tool which is opposite the end having the cavities).

Figure 9:
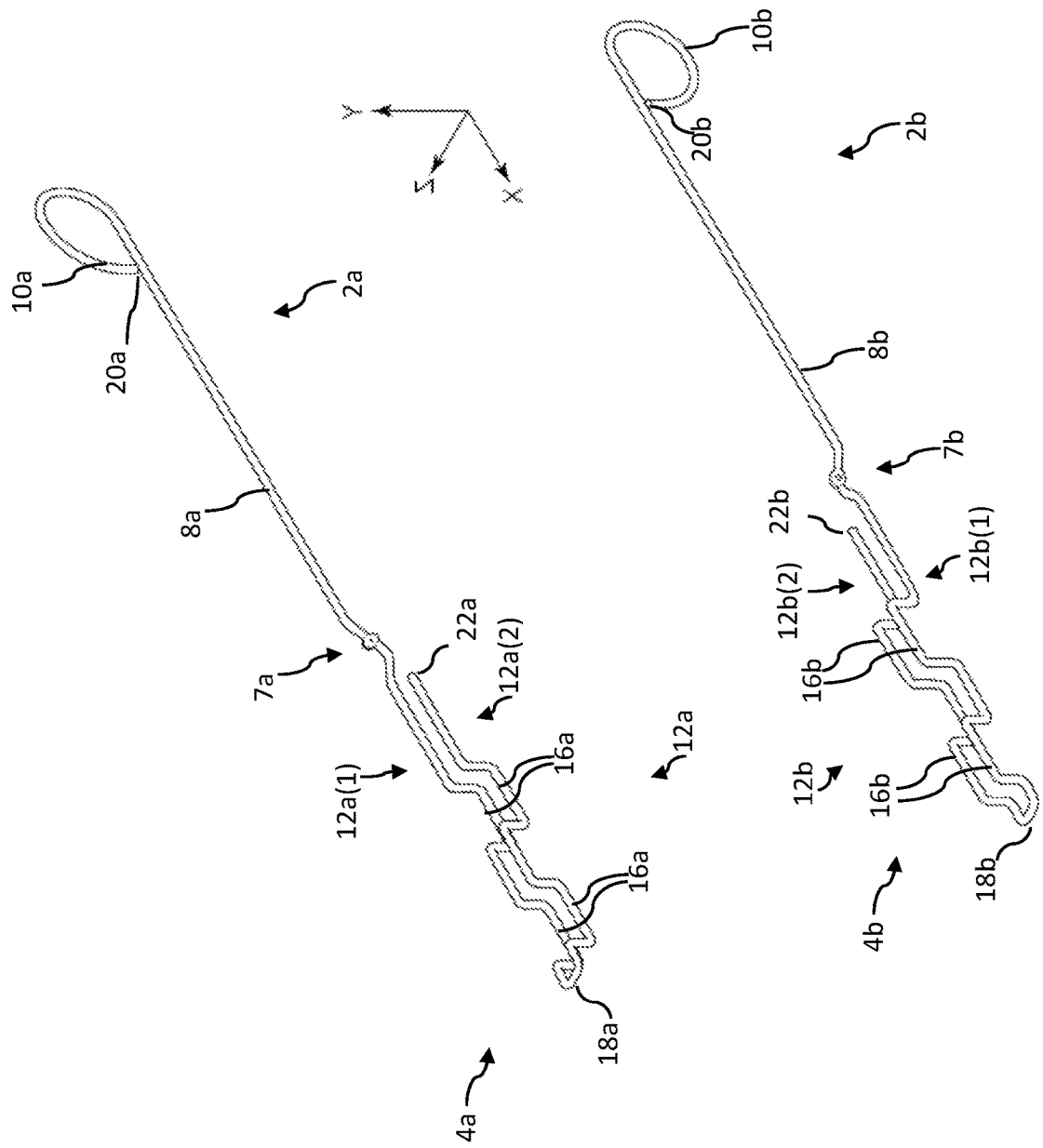
FIG. 9 is an isometric view of the components of a tool similar to that of FIG. 5.

FIGS. 5-9 are several views including an isometric view (FIG. 5), a top view (FIG. 6), a side view in the closed position (FIG. 7), a side view in the open position (FIG. 8), and an isometric view of individual components (FIG. 9), collectively depicting a tool 50 for roasting food over an open flame or heat source. A tool 50 generally includes a shank section 2 (having sides 2a and 2b) and an arm section 4 (having sides 4a and 4b) pivotally connected at a fulcrum 6 with a suitable pivot 7a and 7b. In the isometric and side views of FIGS. 5 and 7-9, the parts designated "a" correspond to the parts towards the top of the figure on the shank section 2, and to the parts towards the bottom of the figure in the arm section 4. Likewise, the parts designated "b" correspond to the parts towards the bottom of the figure on the shank section 2, and to the parts towards the top of the figure in the arm section 4. FIG. 9 depicts isometric views of each of the parts individually for clarity of exposition.

The tool 50 is generally in the form of tongs, that is, a first-class double-lever with the pivot acting as the fulcrum 6, and generally comprises the shank section and the arm section. In particular, the tool comprises a first tong member 2a, 4a pivotally connected to a second tong member 2b, 4b. The tong members are elongated rod or rigid wire elements that are mainly on a first plane and a second plane spaced apart by the height of the section about the pivots 7a and 7b. That is, a first shank 8a and a second arm 12b are on a first plane, and a second shank 8b and a first arm 12a are on a second plane.

The first tong member 2a, 4a including the first shank 8a is elongated in a first direction along the first plane. The distal end of the first shank 8a includes a first actuating tail section 10a. At an opposing distal end of the first shank 8a, a bend in the element forms the pivot 7a section so that it extends diagonally to the height of the second plane, and the first arm 12a is elongated in the first direction and is on the second plane. The first arm 12a has one or more shaped portions 16a forming a portion of a cage 14. As shown, the shaped portions 16a are substantially U-shaped. Likewise, the second tong member 2b, 4b including the second shank 8b is elongated in a direction along the second plane. The distal end of the second shank 8b includes a second actuating tail section 10b. At an opposing distal end of the second shank 8b, a bend in the element forms the pivot 7b section so that it extends diagonally to the height of the first plane, and the second arm 12a is elongated in the first direction and is on the first plane. The second arm 12b has one or more shaped portions 16b forming a portion of a cage 14. As shown, the shaped portions 16b are substantially U-shaped.

In the configuration where the tong members are pivotally connected, and in the closed position, the shank and arm of each tong member are offset by a bend proximate to the pivot section so that they occupy both planes. When the tool in the open position, planes pivot away from one another.

In certain embodiments, the handle region and the food holding region of the first tong member 2a, 4a is formed by a single element. A rigid wire or rod is bent around to form spaced apart arm sections that can be parallel as shown or non-parallel (so long as the one or more shaped portions are provided of suitable position, dimension and configuration to form a suitable cage structure for seizing an article) each having at least one shaped portion 16a (as shown in the figures there are two but a single one on each of the spaced apart parallel arm sections is also contemplated) or both 16a and 16b. As shown, both 16a and 16b are spaced apart shaped portions; however in certain embodiments (not shown) only one or the other side has spaced apart parallel arm sections, and the other arm having a single section, with or without shaped portions), and wherein a blunted distal end of the arm(s) is(are) formed by the region(s) where the element(s) is(are) bent around.

The shank section 2 generally includes a pair of extended shanks 8a and 8b. In this description they are referred to as the top and bottom shanks as they are oriented as in the isometric and side views. Each of the top shank and bottom shank 8a and 8b have a structure integral therewith or attached thereto at the distal end formed in a suitable configuration and of a suitable dimension for holding and manipulation. For instance, as shown in the embodiment of FIGS. 5-9, the handle section distal end is formed by loop portions 10a and 10b. As shown the loop portions 10a and 10b are each configured and dimensioned, for instance, for passing one's fingers therethrough in order to manipulate the tool 50 between the closed and open position and to hold the tool 50 in the closed position when in use. Other configurations and dimensions are also suitable as will be apparent.

The food holding section 4 generally includes two opposing and pivotally engaged pairs of holding arm sections 12a and 12b, each having arm elements 12a(1), 12a(2) and 12b(1), 12b(2). As oriented in the drawings, holding arms 12b are on top and holding arms 12a are on the bottom, so that when the tool is in the closed position and food of appropriate dimension is inserted therein, one or more cages are formed about regions 14 to holds the food by its outer surfaces. The cages are formed by opposing shaped portions 16a, 16b integral to the corresponding arms 12a, 12b. The shaped portions 16a, 16b, for instance as shown in a generally U-shape. As is apparent, when the tool is in the closed position, the first and second cages are formed, each having four bars, that is, two portions 16a and two portions 16b, to hold the food over an open flame for roasting. In addition, the food holding section 4 terminates with opposing end portions 18a and 18b, which are blunted or rounded, rather than a pointed end as in conventional open flame cooking tools.

Each of the sides a and b (that is, side a is the contiguous structure formed the handle section 2a and food holding section 4a and side b is the contiguous structure formed the handle section 2b and food holding section 4b) is formed of a single wire, rod or other elongated element that is bent, cast or otherwise manufactured to produce the shapes therein, for instance as shown in the embodiment of FIGS. 5-9. For example, side a can be formed of a contiguous elongated element having a first distal end 20a that is part of the handle section side 2a (the loop portion 10a in one example as shown in the embodiment of FIGS. 5-9) and a second distal end 22a that is part of the food holding section side 4a (the holding arm 12a proximate the pivot structure and/or portion 6 in one example as shown in the embodiment of FIGS. 5-9).

Figure 1:
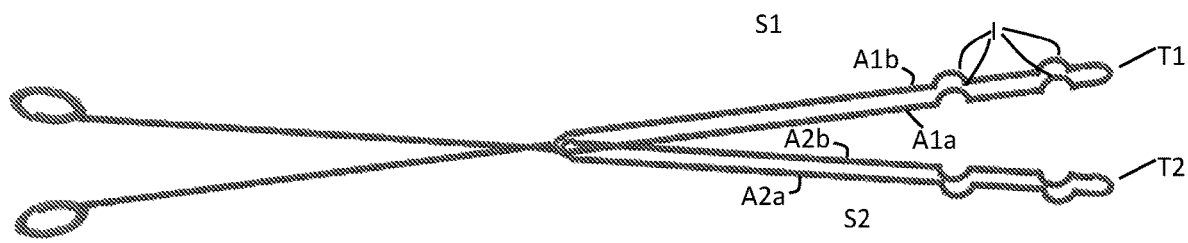
FIG. 1 is an isometric view of an embodiment of a tool for roasting food over an open flame or heat source, in an open position.
Figure 2:
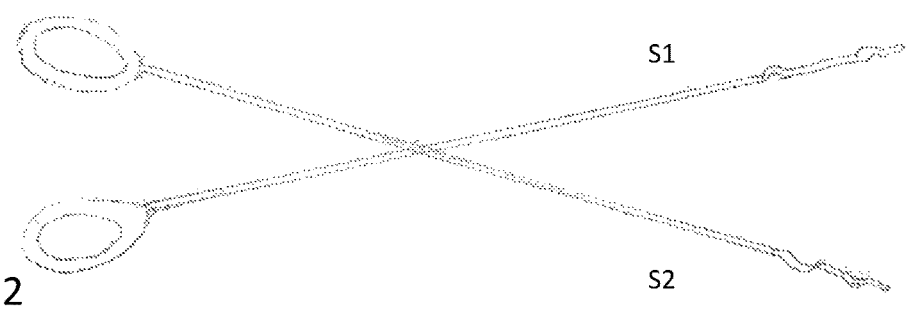
FIG. 2 is a side view of a tool similar to that of FIG. 1, in an open position.
Figure 3:
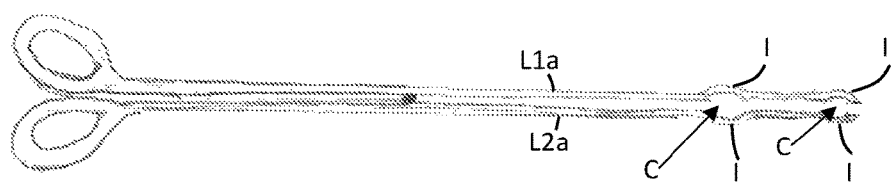
FIG. 3 is a side view of a tool similar to that of FIG. 1, in a closed position.
Figure 4:
FIG. 4 is a top view of a tool similar to that of FIG. 1, in a closed position.
Figure 5:
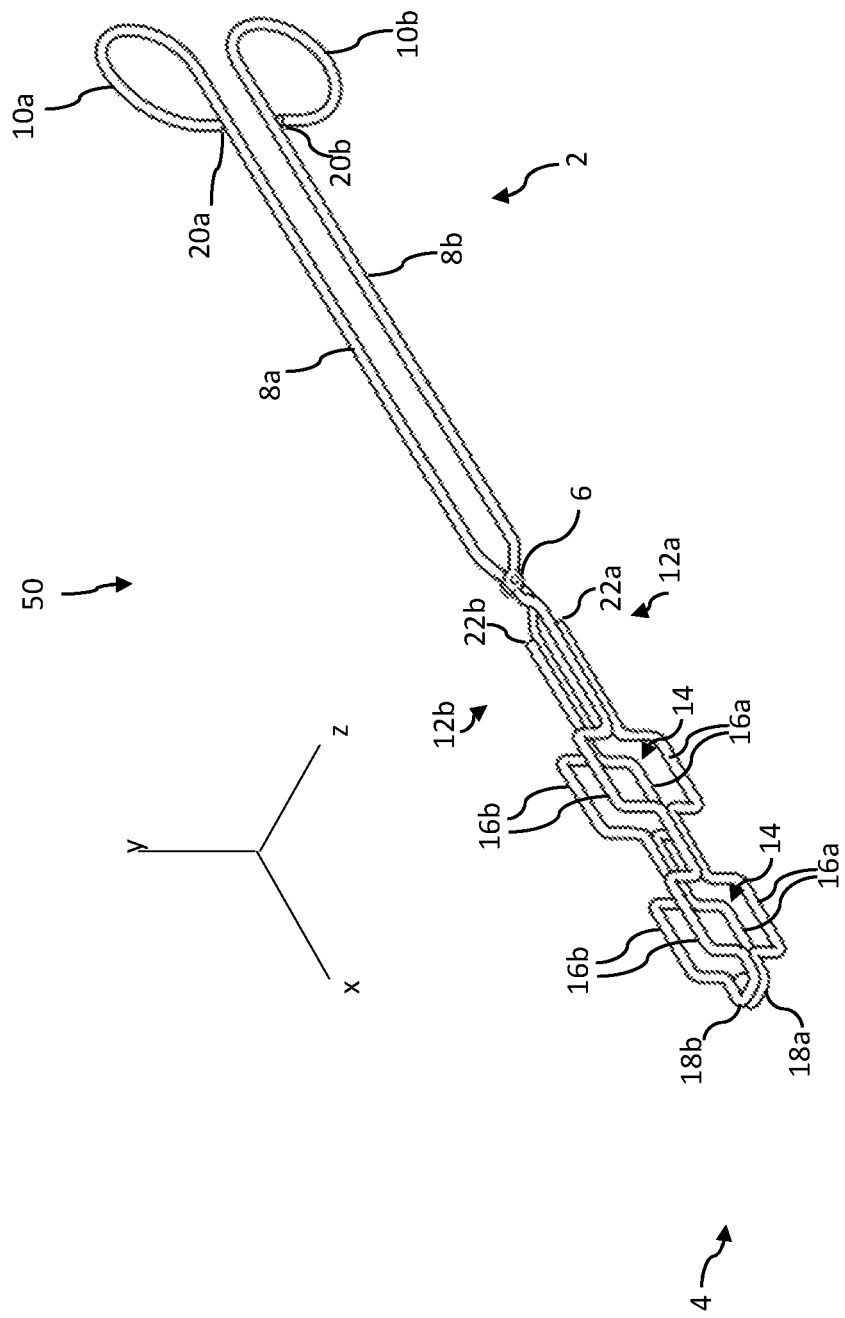
FIG. 5 is an isometric view of another embodiment of a tool for roasting food over an open flame or heat source, in a closed position.
Figure 6:
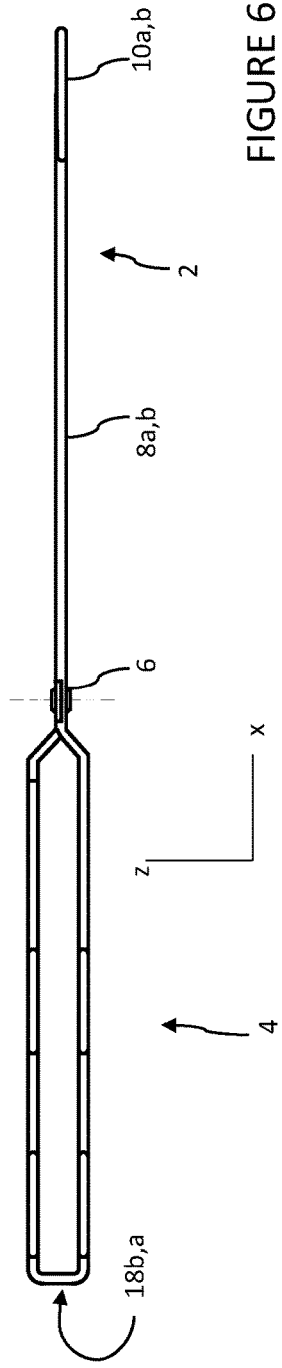
FIG. 6 is a top view of a tool similar to that of FIG. 5, in a closed position.
Figure 7:
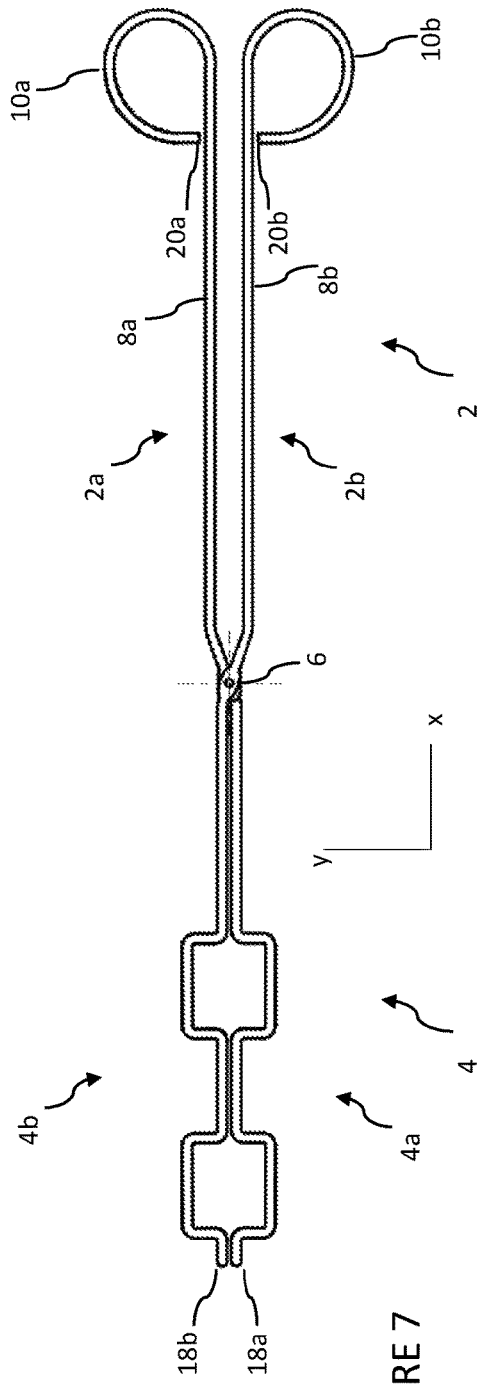
FIG. 7 is a side view of a tool similar to that of FIG. 5, in a closed position.
Figure 8:
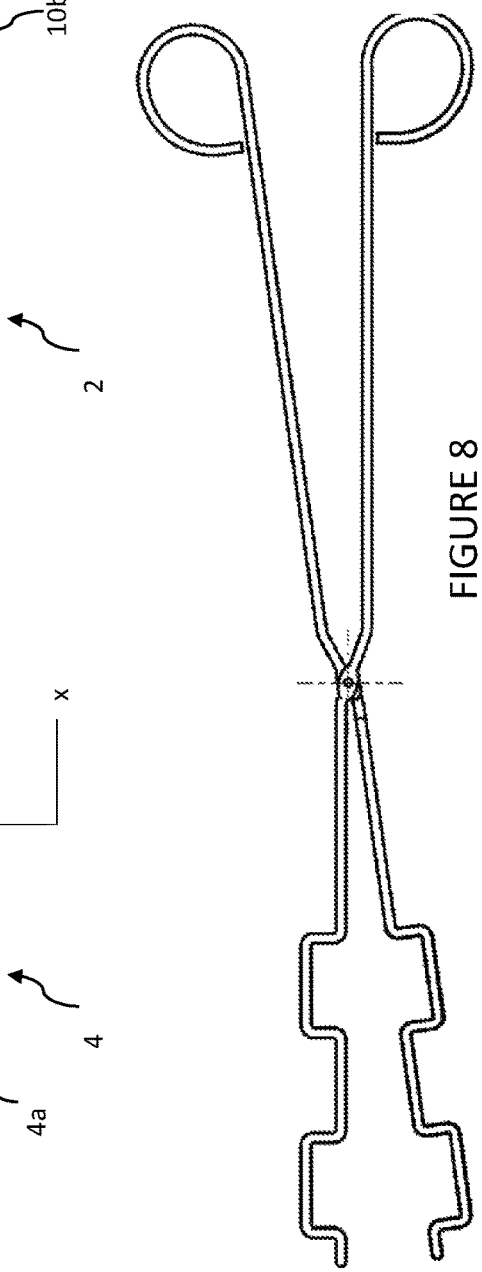
FIG. 8 is a side view of a tool similar to that of FIG. 5, in an open position.

In one embodiment, the contiguous elongated element can be formed by: starting from the first distal end 20a, turning the element form the loop portion 10a, for instance in a curved manner initially in the x-axis and y-axis direction −X+Y, curving in the x-axis and y-axis direction −X-Y, then looping back in the x-axis and y-axis direction +X-Y to the X and Y position proximate to the that of the first distal end 20a, for instance, forming a loop of an appropriate dimension for a finger or thumb; extending from the end of the loop straight in the x-axis direction +X, for instance to form the extended leg 8a to a position near the X position of the pivot structure and/or portion 6; turning down in the x-axis and y-axis direction +X-Y as shown and oriented in FIGS. 5 and 7 through and beyond the pivot structure and/or portion 6; turning in the x-axis and z-axis direction +X-Z to form a neck region of the holding arm 12a near the pivot structure and/or portion 6; extending straight in the x-axis direction +X to the region of the first of the two cages; turning in the y-axis direction −Y, turning in the x-axis direction +X, and turning in the y-axis direction +Y, to form a first half of the first cage portion 16a, for instance in a U-shaped configuration; extending straight in the x-axis direction +X to the region of the second of the two cages; turning in the y-axis direction −Y, turning in the x-axis direction +X, and turning in the y-axis direction +Y, to form a first half of the second cage portion 16a, for instance in a U-shaped configuration; extending straight in the x-axis direction +X to the region of the end portion 18a; turning in the z-axis direction +Z past the Z position of the pivot, then turning in the x-axis direction −X, to form the end portion 18a, for instance in a U-shaped configuration; extending straight in the x-axis direction −X to the region of the second of the two cages; turning in the y-axis direction −Y, turning in the x-axis direction −X, and turning in the y-axis direction +Y, to form a second half of the second cage portion 16a, for instance in a U-shaped configuration; extending straight in the x-axis direction −X to the region of the first of the two cages; turning in the y-axis direction −Y, turning in the x-axis direction −X, and turning in the y-axis direction +Y, to form a second half of the first cage portion 16a, for instance in a U-shaped configuration; extending straight in the x-axis direction −X to the approximately to the end of neck region of the holding arm 12a distal from the pivot terminating at the second distal end 22a.

In certain embodiments, one or more inwardly facing prongs or teeth can be provided within the cavity. In this manner, the food is held by both wrapping about the cavity as in the other embodiments, and also further securing it with the prongs or teeth.

Note that in certain embodiments the application of the tool 50 is for very light food items, such as marshmallows, and as such the configuration and dimension for holding and manipulation are not necessarily important. For instance, scissor-like handles can be provided as shown. However, simple rods of wider diameter can also be used, or any other suitable shape that can be held by a user, preferably with one hand.

In embodiments herein, two cages are provided on the tool. However, a tool with a single cage can also be useful. Further, a tool with 3, 4, 5 or more cages can be provided, so long as the distance between the handle and the flame or heat source is safe so that the overall length is suitable to maintain a safe distance between the handle section distal end and the area of the holding section that is held over the flame, as disclosed herein.

In certain embodiments, the holding section can be formed of removably attached elements. For instance, the handle section may be connected to the pivot with stubs extending therefrom, where the holding section arms are removably attached to the stubs (for instance with a twist lock fit or threaded coupling section).

In certain embodiments, the shaped portions can be removably attached, so as to replace sections, or provide sections of different dimensions and/or configurations.

The tool can be formed of any suitable material, such as a stiff wire or rod, for instance steel or stainless steel. Food-grade materials at least at the food holding sections are particularly suitable. In certain embodiments at least at the food holding sections are formed of or coated with a non-stick material that resists tacking of the food, for instance, the gooey marshmallow, and that is resistant to exposure to an open flame.

In certain embodiments the arms can be formed of a wire or rod that can be readily bent by hand by the user into a preferred shape. In other embodiments the arms are formed of a rigid or hardened material that is not meant to be bent by a user. The cross-section of the arms can be any suitable shape such as circular, oval, rectangular, square, triangular, or any other regular or irregular polygon.

The overall length of the tool is suitable to maintain a safe distance between the handle section distal end and the area of the holding section that is held over the flame. In certain embodiments, the overall length including the handle portion of about 18-36, 18-32, 18-29, 18-26, 20-36, 20-32, 20-29, 20-26, 22-36, 22-32, 22-29 or 20-26 inches.

Appropriate cavity dimensions are suitable to hold a standard size marshmallow, hot dog, etc. In certain embodiments the cavity is about 0.6-1.3, 0.6-1.25 or 0.6-1.0 inches in width (between adjacent parallel cavity-forming arm portions), about 0.8-1.3, 0.8-1.25 or 0.8-1.2 inches in height (from opposing halves of the cavity), and about 0.8-1.3, 0.8-1.25 or 0.8-1.2 inches in length (along the length of the cavity-forming arm portions).

In certain embodiments, the overall length including the handle portion is about 22-26 inches, the arms are spaced apart to form a cavity of about 0.6 to 1.0 inches between the arms, and about 0.8 to 1.2 inches along the length of the arms, shown in the drawings as ¾ inches between the arms and 1 inch along the length of the arms.

The apparatus of the present invention has been described above and in the attached drawings; however, modifications will be apparent to those of ordinary skill in the art and the scope of protection for the invention is to be defined by the claims that follow.

The invention claimed is:

1. A tool for seizing an article comprising:
a first tong member and a second tong member pivotally engaged about a fulcrum;
the tool having
an overall length of about 18-36 inches,
a handle region and a food holding region formed by the first tong member and the second tong member, and at least the food holding region formed of food grade metal suitable for roasting over an open flame or heat source;
the first tong member including
a first shank and a first arm extending generally in the same direction with a first pivot section offsetting the first shank and the first arm,
the first shank having a first actuating tail at a distal end of the first shank and extending to a shank side of the first pivot section,
the first arm having a blunt end at a distal end of the first arm and extending to an arm side of the first pivot section, and one or more shaped portions forming a first side of a cage;
the second tong member including a second shank configured and dimensioned to mate with the first shank, a second arm configured and dimensioned to mate with the first arm, and a second pivot section to mate with the first pivot section at the fulcrum, the second arm including regions that mate with the one or more shaped portions of the first arm to enclose the cage;

wherein in a first position about the fulcrum the shaped portion, and the region of the second arm that mate with the shaped portion, are spaced apart, and in a second position about the fulcrum the shaped portion, and the region of the second arm that mate with the shaped portion, are touching or proximate one another to enclose the cage for seizing an article; and wherein the first tong member includes a pair of arms, each arm having at least one shaped portion, and wherein the arms adjoin and form the blunt end of the first tong member.

2. The tool as in claim 1, wherein the fulcrum is at a location along a length of the first tong member and the second tong member within the center one-third of the length.

3. The tool as in claim 1, wherein at least a portion of the handle region is formed of or covered in heat resistant material.

4. The tool as in claim 1, wherein the cage is configured and dimensioned to hold food with minimal pressure to prevent or minimize crushing.

5. The tool as in claim 1, wherein the second tong member includes regions of the second arm that mate with the one or more shaped portions of the first arm to enclose the cage which are straight.

6. The tool as in claim 1, wherein the second tong member includes regions of the second arm that mate with the one or more shaped portions of the first arm to enclose the cage which are shaped portions of different dimension and/or configuration of the those on the first arm.

7. The tool as in claim 1, wherein the second tong member includes regions of the second arm that mate with the one or more shaped portions of the first arm to enclose the cage which are shaped portions of similar dimension and configuration of the those on the first arm.

8. The tool as in claim 1, wherein the second tong member includes the second shank and the second arm extending generally in the same direction with the second pivot section offsetting the second shank and the second arm;

the second shank having a second actuating tail at a distal end of the second shank and extending to a shank side of the second pivot section;

the second arm having a blunt end at a distal end of the second arm and extending to an arm side of the second pivot section; and one or more shaped portions forming a second side of the cage;

wherein the second tong member further includes a pair of arms, each arm having at least one shaped portion, and wherein the arms adjoin and form the blunt end of the second tong member.

9. The tool as in claim 8, wherein the cage is configured and dimensioned to hold food with minimal pressure to prevent or minimize crushing.

10. The tool as in claim 8, wherein the cage is configured and dimensioned with a width of about 0.6-1.3 inches, a height of about 0.6-1.3 inches and a length of about 0.6-1.3 inches.

* * * * *